United States Patent
Watanabe et al.

(10) Patent No.: US 12,100,997 B2
(45) Date of Patent: Sep. 24, 2024

(54) MOTOR, FAN, AND AIR CONDITIONER

(71) Applicant: Mitsubishi Electric Corporation, Tokyo (JP)

(72) Inventors: Takanori Watanabe, Tokyo (JP); Hiroki Aso, Tokyo (JP); Kazuchika Tsuchida, Tokyo (JP); Takaya Shimokawa, Tokyo (JP); Ryogo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 260 days.

(21) Appl. No.: 17/792,434

(22) PCT Filed: Feb. 27, 2020

(86) PCT No.: PCT/JP2020/008019
§ 371 (c)(1),
(2) Date: Jul. 13, 2022

(87) PCT Pub. No.: WO2021/171476
PCT Pub. Date: Sep. 2, 2021

(65) Prior Publication Data
US 2023/0006489 A1    Jan. 5, 2023

(51) Int. Cl.
*H02K 1/276* (2022.01)
*F24F 1/0018* (2019.01)
*H02K 1/16* (2006.01)

(52) U.S. Cl.
CPC ......... *H02K 1/2766* (2013.01); *F24F 1/0018* (2013.01); *H02K 1/165* (2013.01); *H02K 2213/03* (2013.01)

(58) Field of Classification Search
CPC ... H02K 1/2766; H02K 1/165; H02K 2213/03
(Continued)

(56) References Cited

U.S. PATENT DOCUMENTS

| | | | |
|---|---|---|---|
| 7,233,090 B2* | 6/2007 | Evans | H02K 1/276 310/156.57 |
| 2002/0171308 A1* | 11/2002 | Inayama | H02K 21/14 310/156.43 |

(Continued)

FOREIGN PATENT DOCUMENTS

| | | |
|---|---|---|
| CN | 110299773 A | 10/2019 |
| JP | 2004-201406 A | 7/2004 |

(Continued)

OTHER PUBLICATIONS

Extended European Search Report issued May 10, 2023 in connection with counterpart European Patent Application No. 20921355.2.

(Continued)

*Primary Examiner* — Jose A Gonzalez Quinones
(74) *Attorney, Agent, or Firm* — Posz Law Group, PLC

(57) ABSTRACT

A motor includes a rotor and a stator. In a plane orthogonal to an axis direction of the rotor, the motor satisfies W2<W1<M1, and T1<W1<T1+2×T2, where M1 is a width of a surface of a permanent magnet, W1 is a maximum width of a portion of an inner wall of a first magnet insertion hole in contact with the surface, W2 is a minimum width from the first magnet insertion hole to a second magnet insertion hole, (Continued)

T1 is a width of a first front end surface of a first tooth, and T2 is a width from the first front end surface to a second front end surface of a second tooth.

12 Claims, 11 Drawing Sheets

(58) Field of Classification Search
USPC .............. 310/156.01, 156.57, 156.83, 156.84
See application file for complete search history.

(56) References Cited

U.S. PATENT DOCUMENTS

| | | | |
|---|---|---|---|
| 2006/0279158 A1* | 12/2006 | Kim | ........................ H02K 1/08 |
| | | | 310/156.53 |
| 2015/0256038 A1* | 9/2015 | Nigo | ..................... F25B 31/026 |
| | | | 310/156.57 |
| 2018/0219438 A1 | 8/2018 | Oikawa et al. | |
| 2021/0234420 A1 | 7/2021 | Shimokawa et al. | |

FOREIGN PATENT DOCUMENTS

| | | | |
|---|---|---|---|
| WO | 2017/0085814 A1 | 5/2017 | |
| WO | WO-2017085814 A1 * | 5/2017 | .............. F25B 31/00 |
| WO | 2020/003341 A1 | 1/2020 | |

OTHER PUBLICATIONS

Office Action issued Jul. 4, 2023 in connection with counterpart Japanese Patent Application No. 2022-502709 (and English machine translation).
International Search Report of the International Searching Authority mailed Apr. 7, 2020 for the corresponding international application No. PCT/JP2020/008019 (and English translation).
Office Action issued on Jan. 31, 2023 in corresponding JP Patent Application No. 2022-502709 (and machine English translation).
Office Action issued Nov. 22, 2022 in corresponding IN Patent Application No. 202227047285.
Office Action issued on Mar. 24, 2023 in corresponding Australian Patent Application No. 2020430939.

* cited by examiner

MOTOR, FAN, AND AIR CONDITIONER

CROSS REFERENCE TO RELATED APPLICATION

This application is a U.S. national stage application of International Patent Application No. PCT/JP2020/008019 filed on Feb. 27, 2020, the disclosure of which is incorporated herein by reference.

TECHNICAL FIELD

The present disclosure relates to a rotor of a motor.

BACKGROUND

A consequent pole rotor including a first magnetic pole portion having a first polarity and a second magnetic pole portion having a second polarity and serving as a pseudo-magnetic pole has been employed in order to reduce the amount of permanent magnets used in a rotor for a motor. In a consequent pole rotor described in Patent Reference 1, for example, to increase an average magnetic flux density between a stator and a rotor, an occupancy angle of the first magnetic pole portion having a first polarity and an occupancy angle of a second magnetic pole portion having a second polarity and serving as a pseudo-magnetic pole are set.

PATENT REFERENCE

Japanese Patent Application Publication No. 2004-201406

In the technique disclosed in Patent Reference 1, holes in which permanent magnets are placed communicate with spaces adjacent to the holes. This configuration reduces magnetic flux leakage passing through regions between the holes in which the permanent magnets are placed and the spaces. That is, the configuration reduces magnetic flux leakage flowing from north poles of the permanent magnets into south poles of the permanent magnets. Conventional techniques, however, do not consider magnetic flux leakage other than effective magnetic flux flowing from a consequent pole rotor into target tooth of a stator. That is, magnetic flux leakage flowing into a tooth adjacent to the target tooth is not taken into consideration. Thus, in the conventional techniques, even if a large permanent magnet is disposed in the consequent pole rotor, magnetic flux from the permanent magnet cannot be effectively used.

SUMMARY

It is therefore an object of the present disclosure to increase effective magnetic flux flowing from a permanent magnet of a consequent pole rotor into a target tooth of a stator in order to reduce magnetic flux leakage flowing into tooth adjacent to the target tooth.

A motor according to an aspect of the present disclosure includes:

a consequent pole rotor including a rotor core, a permanent magnet, a first magnetic pole region, and a second magnetic pole region, the rotor core having a first magnet insertion hole and a second magnet insertion hole adjacent to the first magnet insertion hole, the permanent magnet being disposed in the first magnet insertion hole, the first magnetic pole region functioning as a first magnetic pole, the second magnetic pole region serving as a second magnetic pole, the second magnetic pole being a pseudo-magnetic pole, the pseudo-magnetic pole being formed of a part of the rotor core between the first magnet insertion hole and the second magnet insertion hole; and a stator including a core back extending in a circumferential direction, a first tooth extending from the core back in a first radial direction of the consequent pole rotor, and a second tooth adjacent to the first tooth, the stator being disposed outside the consequent pole rotor, wherein an inner wall of the first magnet insertion hole facing inward in the first radial direction is in contact with a surface of the permanent magnet, the surface facing outward in the first radial direction, and the motor satisfies $W2<W1<M1$, and $T1<W1<T1+2+T2$, where M1 is a width of the surface of the permanent magnet in a longitudinal direction of the permanent magnet in a plane orthogonal to an axis direction of the consequent pole rotor, W1 is a maximum width of a portion of the inner wall of the first magnet insertion hole in the plane, the portion being in contact with the surface of the permanent magnet, W2 is a minimum width from the first magnet insertion hole to the second magnet insertion hole in the plane, T1 is a width of a first front end surface of the first tooth facing the rotor core in a first direction orthogonal to the first radial direction in the plane, and T2 is a width from the first front end surface to a second front end surface of the second tooth facing the rotor core in the first direction, wherein the first magnet insertion hole includes a magnet placement portion in which the permanent magnet is placed, and a space communicating with the magnet placement portion and facing the second tooth in the longitudinal direction of the permanent magnet, and in a case where a magnetic pole center line passing through a magnetic pole center of the first magnetic pole coincides with the first radial direction in the plane, the motor satisfies $FB1>FB2$ where FB2 is a width of a portion of the space facing the second front end surface in a direction orthogonal to a second radial direction in which the second tooth extends from the core back in the plane, and FB1 is a width of the space facing the second tooth in the direction orthogonal to the second radial direction in the plane.

A motor according to another aspect of the present disclosure includes: a consequent pole rotor including a rotor core, a permanent magnet, a first magnetic pole region, and a second magnetic pole region, the rotor core having a first magnet insertion hole and a second magnet insertion hole adjacent to the first magnet insertion hole, the permanent magnet being disposed in the first magnet insertion hole, the first magnetic pole region functioning as a first magnetic pole, the second magnetic pole region serving as a second magnetic pole, the second magnetic pole being a pseudo-magnetic pole, the pseudo-magnetic pole being formed of a part of the rotor core between the first magnet insertion hole and the second magnet insertion hole; and a stator including a core back extending in a circumferential direction, a first tooth extending from the core back in a first radial direction of the consequent pole rotor, and a second tooth adjacent to the first tooth, the stator being disposed outside the consequent pole rotor, wherein an inner wall of the first magnet insertion hole facing inward in the first radial direction is in contact with a surface of the permanent magnet, the surface facing outward in the first radial direction, the motor satisfies $\theta W2<\theta W1<\theta M1$, and $\theta T1<\theta W1<\theta T1+2\times\theta T2$, where M1 is a width of the surface of the permanent magnet in a longitudinal direction of the permanent magnet in a plane orthogonal to an axis direction of the consequent pole rotor, W1 is a maximum width of a portion of the inner wall of the first magnet insertion hole in the plane, the portion being in contact with the surface of the permanent magnet, W2 is a minimum width from the first magnet insertion hole to the second magnet insertion hole in the plane, T1 is a width of a first front end surface of the first tooth facing the rotor core in a first direction orthogonal to the first radial direction in the plane, T2 is a width from the first front end surface to a second front end surface of the second tooth facing the rotor core in the first direction, $\theta W1$ is an angle at which two lines respectively passing through two points forming the maximum width W1 intersect at a rotation center of the consequent pole rotor in the plane, $\theta W2$ is an angle at which two lines respectively passing through two points forming the minimum width W2 intersect at the rotation center in the plane, $\theta M1$ is an angle at which two lines respectively passing through two points forming the width M1 intersect at the rotation center, $\theta T1$ is an angle at which two lines respectively passing through two points forming the width T1 intersect at the rotation center in the plane, and $\theta T2$ is an angle at which two lines respectively passing through two points forming the width T2 intersect at the rotation center in the plane, wherein the first magnet insertion hole includes a magnet placement portion in which the permanent magnet is placed, and a space communicating with the magnet placement portion and facing the second tooth in the longitudinal direction of the permanent magnet, and in a case where a magnetic pole center line passing through a magnetic pole center of the first magnetic pole coincides with the first radial direction in the plane, the motor satisfies FB1>FB2 where FB2 is a width of a portion of the space facing the second front end surface in a direction orthogonal to a second radial direction in which the second tooth extends from the core back in the plane, and FB1 is a width of the space facing the second tooth in the direction orthogonal to the second radial direction in the plane.

A fan according to another aspect of the present disclosure includes: a blade; and the motor configured to drive the blade.

An air conditioner according to another aspect of the present disclosure includes: an indoor unit; and an outdoor unit connected to the indoor unit, wherein one or both of the indoor unit and the outdoor unit include the motor.

According to the present disclosure, effective magnetic flux flowing from the permanent magnet of the consequent pole rotor into a target tooth of the stator is increased, and magnetic flux leakage flowing into a tooth adjacent to the target tooth can be reduced.

DETAILED DESCRIPTION

First Embodiment

A motor 1 according to a first embodiment will be described.

In an xyz orthogonal coordinate system shown in each drawing, a z-axis direction (z axis) represents a direction parallel to an axis Ax of the motor 1, an x-axis direction (x axis) represents a direction orthogonal to the z-axis direction (z axis), and a y-axis direction (y axis) represents a direction orthogonal to both the z-axis direction and the x-axis direction. The axis Ax is a rotation center of a rotor 2, that is, a rotation axis of the rotor 2. The direction parallel to the axis Ax will also be referred to as an "axis direction of the rotor 2" or simply an "axis direction." The radial direction refers to a direction of a radius of the rotor 2 or a stator 3, and is a direction orthogonal to the axis Ax. An xy plane is a plane orthogonal to the axis direction. An arrow D1 represents a circumferential direction about the axis Ax. A circumferential direction of the rotor 2 or the stator 3 will also be simply referred to as a "circumferential direction."

<Motor 1>

Figure 1:
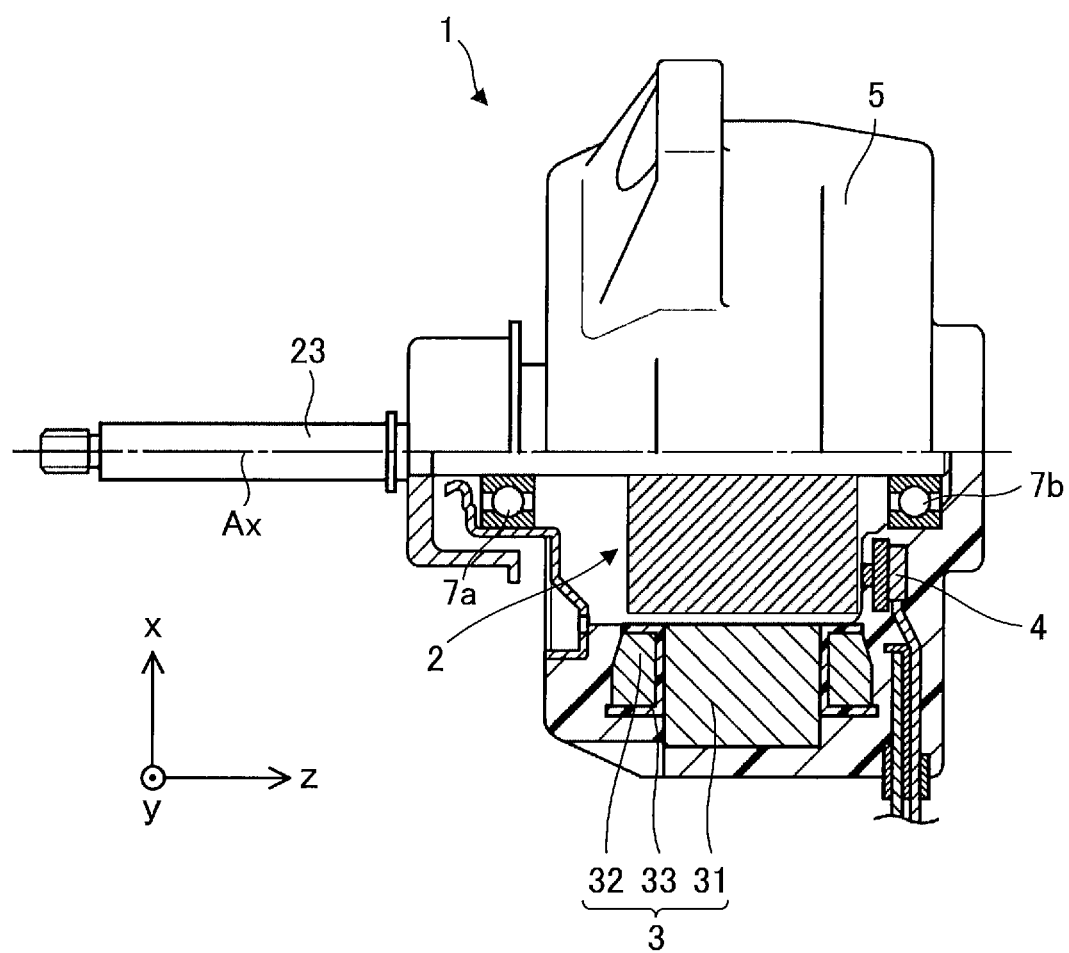
FIG. 1 is a partial cross-sectional view schematically illustrating a structure of a motor according to a first embodiment.

FIG. 1 is a partial cross-sectional view schematically illustrating a structure of the motor 1 according to the first embodiment.

Figure 2:
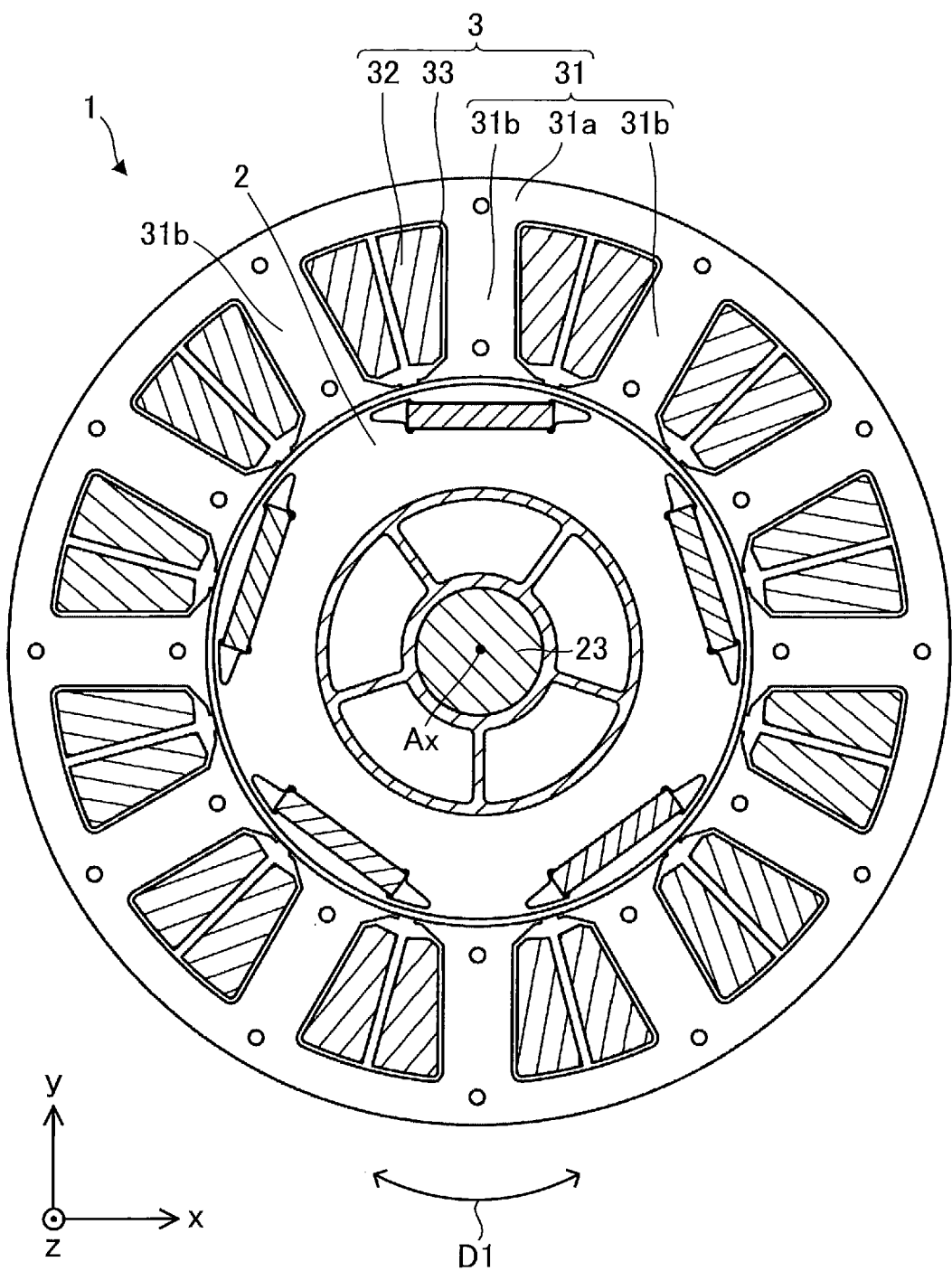
FIG. 2 is a cross-sectional view schematically illustrating the structure of the motor.

FIG. 2 is a cross-sectional view schematically illustrating the structure of the motor 1.

The motor 1 includes the rotor 2, the stator 3, a circuit board 4, a molding resin 5, and bearings 7a and 7b for rotatably retaining the rotor 2. The motor 1 is, for example, a permanent magnet synchronous motor such as an interior permanent magnet motor (IPM motor).

<Stator 3>

The stator 3 is disposed outside the rotor 2. The stator 3 includes a stator core 31, a coil 32, and an insulator 33. The stator core 31 is a ring-shaped core including a core back 31a extending in the circumferential direction and a plurality of teeth 31b extending from the core back 31a in the radial direction.

The stator core 31 is constituted by, for example, a plurality of thin iron magnetic sheets. In this embodiment, the stator core 31 is constituted by a plurality of electromagnetic steel sheets stacked in the axis direction. Each of the electromagnetic steel sheets of the stator core 31 has a thickness of 0.2 mm to 0.5 mm, for example.

The coil 32 (i.e., winding) is wound around the insulator 33 attached to the stator core 31. The coil 32 is insulated by the insulator 33. The coil 32 is made of a material containing copper or aluminium, for example.

The insulator 33 is made of, for example, an insulative resin such as polybutylene terephthalate (PBT), polyphenylene sulfide (PPS), liquid crystal polymer (LCP), or polyethylene terephthalate (PET). The resin insulator 33 is, for example, an insulating film having a thickness of 0.035 mm to 0.4 mm.

For example, the insulator 33 is shaped integrally with the stator core 31. It should be noted that the insulator 33 may be shaped separately from the stator core 31. In this case, after the insulator 33 has been shaped, the insulator 33 is fitted in the stator core 31.

In this embodiment, the stator core 31, the coil 32, and the insulator 33 are covered with the molding resin 5. The stator core 31, the coil 32, and the insulator 33 may be fixed by a cylindrical shell made of a material containing iron, for example. In this case, the stator 3 is covered with the cylindrical shell by shrink fitting together with the rotor 2, for example.

The circuit board 4 is fixed by the molding resin 5 together with the stator 3. The circuit board 4 includes a driving device for controlling the motor 1.

The molding resin 5 unites the circuit board 4 and the stator 3 to each other. The molding resin 5 is, for example, a thermosetting resin such as a bulk molding compound (BMC) or an epoxy resin.

<Rotor 2>

Figure 3:
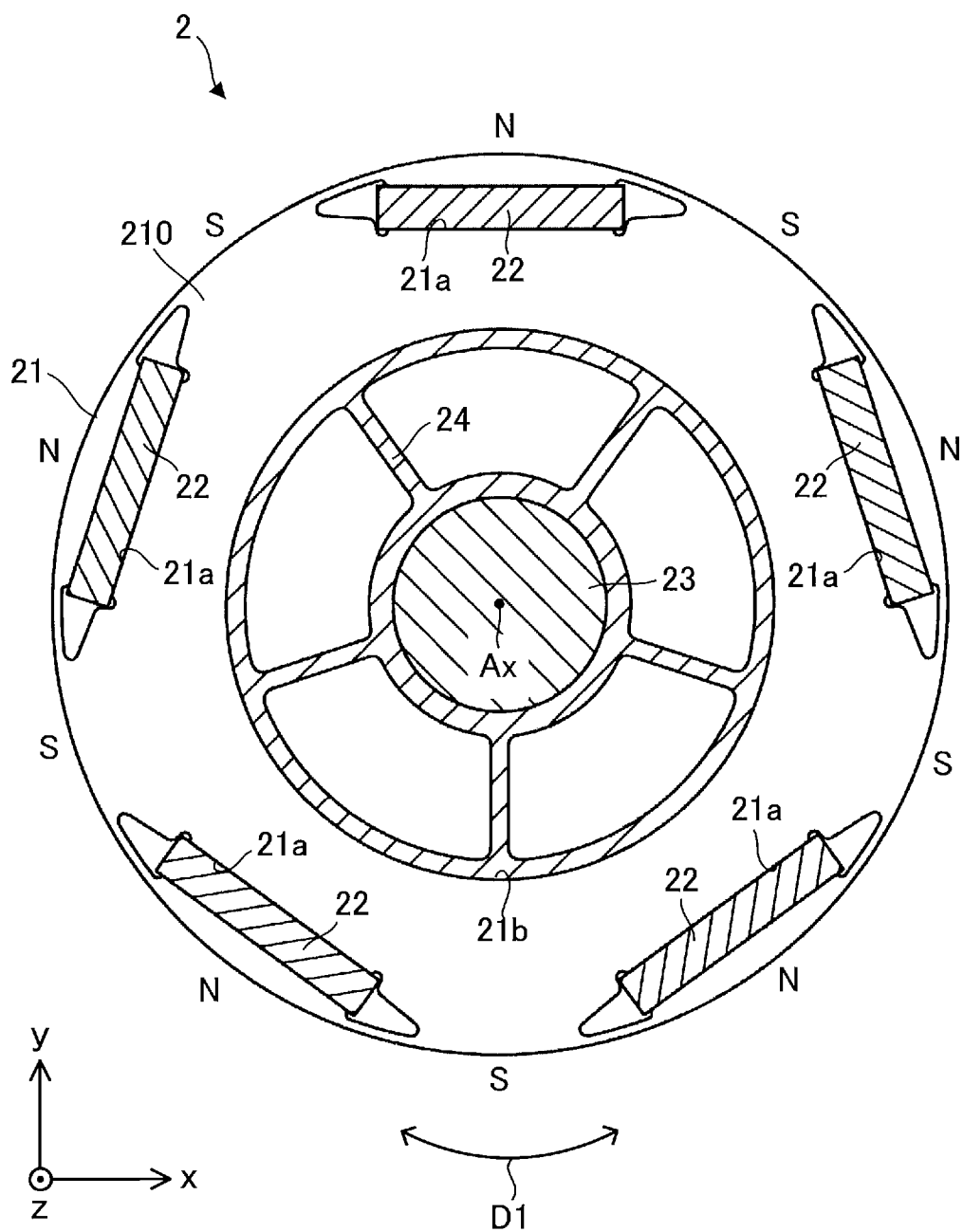
FIG. 3 is a cross-sectional view schematically illustrating a structure of a rotor.
Figure 4:
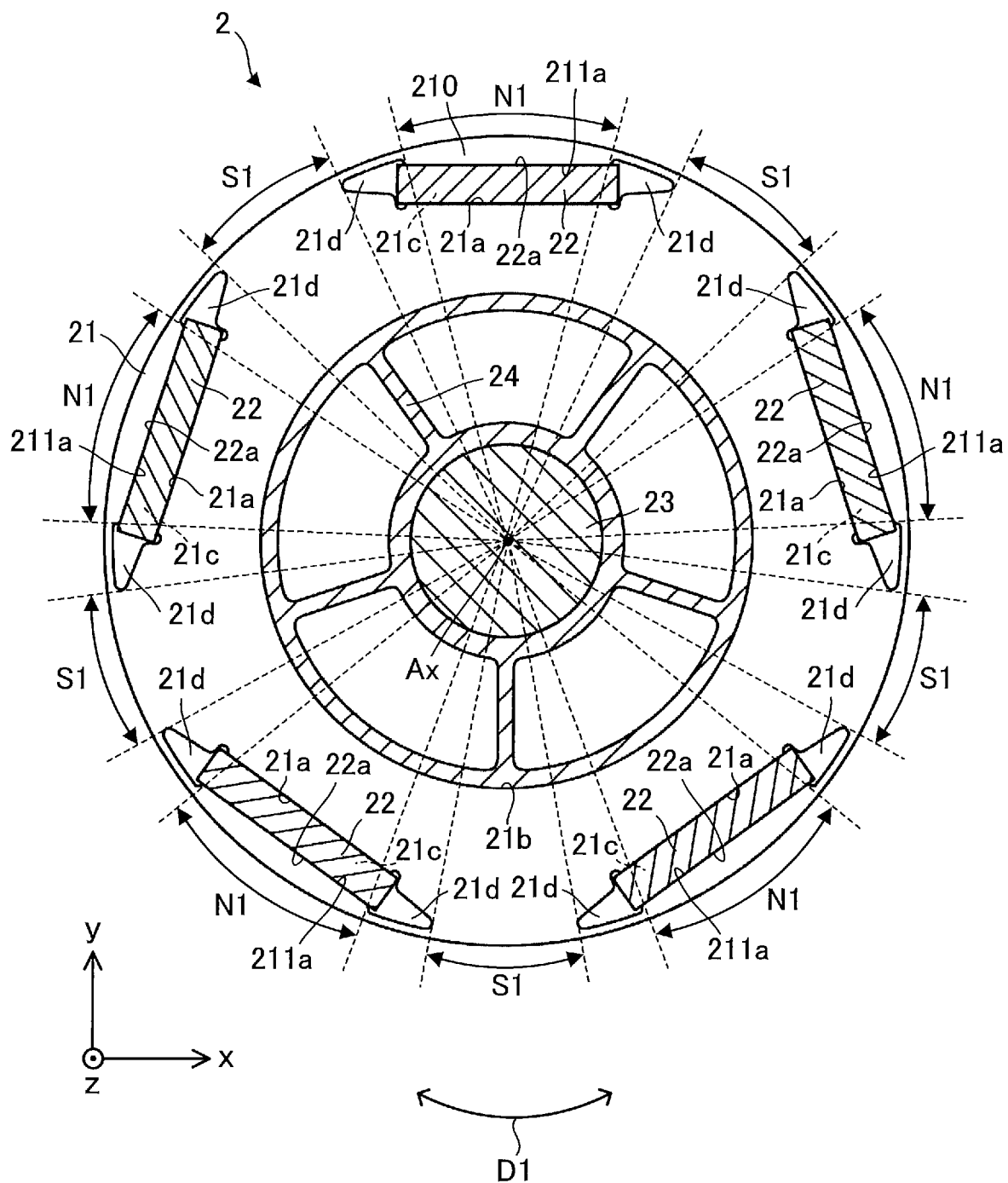
FIG. 4 is a cross-sectional view schematically illustrating the structure of the rotor.

FIGS. 3 and 4 are cross-sectional views schematically illustrating a structure of the rotor 2. In FIG. 3, "N" represents a north pole of the rotor 2 (specifically a north pole functioning to the stator 3), and "S" represents a south pole of the rotor 2 (specifically a south pole functioning to the stator 3).

The rotor 2 includes a rotor core 21, a plurality of permanent magnets 22, a shaft 23, and a nonmagnetic member 24. The rotor 2 is rotatably disposed inside the stator 3. Specifically, the rotor 2 is disposed inside the stator 3 such that the permanent magnets 22 face the stator 3. The rotation axis of the rotor 2 coincides with the axis line Ax. An air space is provided between the rotor core 21 and the stator 3.

The rotor core 21 is constituted by a plurality of cores 210 stacked in the axis direction. The rotor core 21 (i.e., the plurality of cores 210) is fixed to nonmagnetic member 24. The rotor core 21 may be fixed to the shaft 23. The shaft 23 is rotatably held by bearings 7a and 7b. When the motor 1 is driven, the rotor core 21 rotates together with the shaft 23.

In the axis direction, the rotor core 21 may be longer than the stator core 31. Accordingly, magnetic flux from the rotor 2 (specifically, the permanent magnets 22) efficiently flows into the stator core 31.

The rotor core 21 (i.e., the plurality of cores 210) includes a plurality of magnet insertion holes 21a and a shaft insertion hole 21b.

In this embodiment, the rotor core 21 includes a plurality of magnet insertion holes 21a, and at least one permanent magnet 22 is disposed in each of the magnet insertion holes 21a.

The rotor core 21 is constituted by, for example, a plurality of electromagnetic steel sheets. In this case, each of the plurality of cores 210 is an electromagnetic steel sheet. The plurality of cores 210 may include cores other than electromagnetic steel sheets. For example, the rotor core 21 may be constituted by a plurality of iron cores each having a predetermined shape or may be constituted by a mixture of a soft magnetic material and a resin.

Each of the cores 210 of the rotor core 21 has a thickness of 0.2 mm to 0.5 mm, for example. The cores 210 of the rotor core 21 are stacked in the axis direction.

The plurality of magnet insertion holes 21a are formed at regular intervals in the circumferential direction of the rotor core 21. In this embodiment, five magnet insertion holes 21a are disposed in the rotor core 21. Each of the magnet insertion holes 21a includes a magnet placement portion 21c in which at least one permanent magnet 22 is placed, and two spaces 21d communicating with the magnet placement portion 21c in the longitudinal direction of the permanent magnet 22.

The shaft insertion hole 21b is disposed in a center portion of the rotor core 21. The shaft insertion hole 21b penetrates the rotor core 21 in the axis direction. The shaft 23 is disposed in the shaft hole 21b.

The rotor 2 is a consequent pole rotor. Specifically, the rotor 2 includes a first magnetic pole formed of each permanent magnet 22 and a second magnetic pole that is a pseudo-magnetic pole formed of a part of the rotor core 21 between two adjacent magnet insertion holes 21a. That is, the second magnetic pole is a pseudo-magnetic pole formed of a part of the rotor core 21 adjacent to each magnet insertion hole 21a in the circumferential direction of the rotor core 21.

As illustrated in FIG. 4, the rotor core 2 includes a plurality of first magnetic pole regions N1 and a plurality of second magnetic pole regions S1. Each of the first magnetic pole regions N1 is a region including at least a part of the permanent magnet 22 and at least a part of the magnet insertion hole 21a in the xy plane. Specifically, each first magnetic pole region N1 is a region between two lines passing through both ends of a surface 22a of the permanent magnet 22a in contact with an inner wall 211a of the magnet insertion hole 21a facing inward in the radial direction and the rotation center of the rotor in the xy plane. Each of the second magnetic pole regions S1 is a region between two lines passing through one end of each of two adjacent magnet insertion holes 21a and the rotation center of the rotor 2 in the xy plane. That is, each second magnetic pole region S1 is a region not including any of the magnet insertion hole 21a and the permanent magnet 22.

A region between each of the first magnetic pole region N1 and its adjacent second magnetic pole region S1 is an inter-pole region.

Each of the permanent magnets 22 forms a north pole as the first magnetic pole of the rotor 2. A part of the rotor core 21 adjacent to each magnet insertion hole 21a in the circumferential direction of the rotor core 21 forms a south pole as the second magnetic pole that is a pseudo-magnetic pole of the rotor 2. In this case, each of the first magnetic pole regions N1 functions as the first magnetic pole (magnetic pole serving as a north pole to the stator 3 in this embodiment), and each of the second magnetic pole regions S1 functions as the second magnetic pole (pseudo-magnetic pole serving as a north pole to the stator 3 in this embodiment). In other words, each of the first magnetic pole regions N1 functions as a first polarity, and each of the second magnetic pole regions S1 functions as a second polarity different from the first polarity.

The number of permanent magnets 22 is half of the number n (where n is an even number greater than or equal to four) of magnetic poles of the rotor 2. The number n of magnetic poles of the rotor 2 is the sum of the number of magnetic poles functioning as north poles to the stator 3 and the number of magnetic poles functioning as south poles to the stator 3. The north poles and the south poles of the rotor 2 are alternately arranged in the circumferential direction of the rotor 2. In this embodiment, n=10.

The shaft 23 is fixed to the rotor core 21 with the nonmagnetic member 24, for example. The nonmagnetic member 24 is disposed in the shaft insertion hole 21b. The nonmagnetic member 24 couples the shaft 23 to the rotor core 21.

The nonmagnetic member 24 is made of, for example, a non-magnetic material such as austenitic stainless steel, aluminium, a bulk molding compound (BMC), polybutylene terephthalate (PBT), polyphenylene sulfide (PPS), liquid crystal polymer (LCP), or polyethylene terephthalate (PET).

The nonmagnetic member 24 is, for example, a resin. In this case, the nonmagnetic member 24 is made of a nonmagnetic resin such as a bulk molding compound (BMC), polybutylene terephthalate (PBT), polyphenylene sulfide (PPS), liquid crystal polymer (LCP), polyethylene terephthalate (PET).

Each permanent magnet 22 is, for example, a flat-plate permanent magnet. Each permanent magnet 22 may be, for example, a rare earth magnet containing neodymium or samarium. The permanent magnets 22 may be ferrite magnets containing iron. The type of the permanent magnet 22 is not limited to the example of this embodiment, and the permanent magnet 22 may be made of another material.

The permanent magnets 22 in the magnet insertion holes 21a are magnetized in the radial direction and consequently magnetic flux from the permanent magnets 22 flows into the stator 3.

Figure 5:
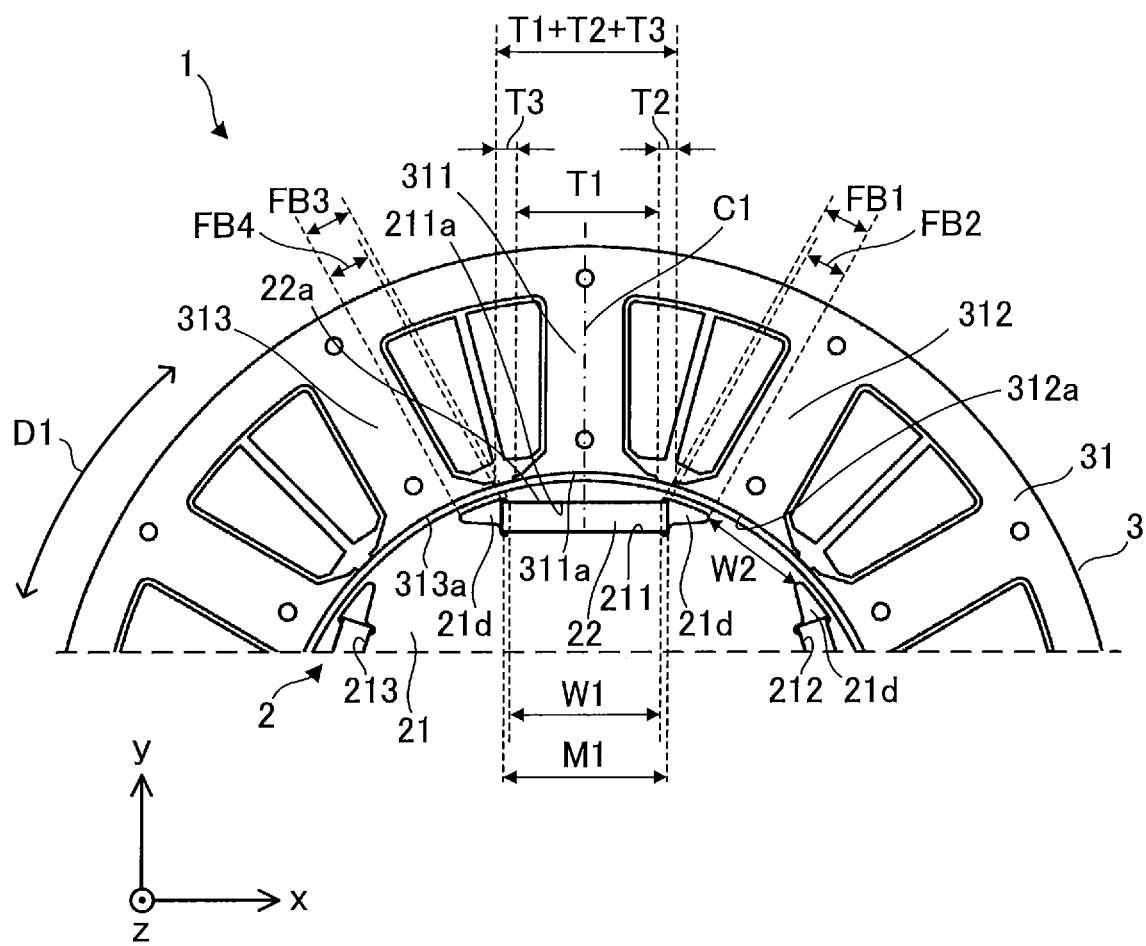
FIG. 5 is a diagram illustrating a part of the motor shown in FIG. 2.

FIG. 5 is a diagram illustrating a part of the motor 1 shown in FIG. 2.

In FIG. 5, the intermediate magnet insertion hole of the three magnet insertion holes will be referred to as a "first magnet insertion hole 211," the right magnet insertion hole of the three magnet insertion holes will be referred to as a "second magnet insertion hole 212," and the left magnet insertion hole of the three magnet insertion holes will be referred to as a "third magnet insertion hole 213." That is, in the xy plane, the second magnet insertion hole 212 and the third magnet insertion hole 213 are adjacent to the first magnet insertion hole 211.

As described with reference to FIG. 4, in the rotor core 21 illustrated in FIG. 5, regions in contact with the permanent magnets 22 are the first magnetic pole regions N1 functioning as first magnetic poles. In the rotor core 21 illustrated in FIG. 5, a region between each first magnet insertion hole 211 and its adjacent second magnet insertion hole 212 is the second magnetic pole region S1 functioning as a second magnetic pole that is a pseudo-magnetic pole.

In FIG. 5, a tooth facing the first magnet insertion hole 211 will be referred to as a "first tooth 311," a tooth on the right side with respect to the first tooth 311 will be referred to as a "second tooth 312," and a tooth on the left side with respect to the first tooth 311 will be referred to as a "third tooth 313." That is, in the xy plane, the second tooth 312 and the third tooth 313 are adjacent to the first tooth 311.

Each tooth 31b has a front end surface facing the rotor core 21. In the example illustrated in FIG. 5, the first tooth 311 has a front end surface 311a facing the rotor core 21, the second tooth 312 has a front end surface 312a facing the rotor core 21, and the third tooth 313 has a front end surface 313a facing the rotor core 21. The front end surface 311a of the first tooth 311 will also be referred to as a "first front end surface 311a," the front end surface 312a of the second tooth 312 will also be referred to as a "second front end surface 312a," and the front end surface 313a of the third tooth 313 will also be referred to as a "third front end surface 313a."

In the xy plane illustrated in FIG. 5, a direction in which the first tooth 311 extends will also be referred to as a "first radial direction," a direction in which the second tooth 312 extends will also be referred to as a "second radial direction," and a direction in which the third tooth 313 extends will also be referred to as a "third radial direction."

In the xy plane, a magnetic pole center line C1 indicating the center of the first magnetic pole passes through the center of the permanent magnet 22. As illustrated in FIG. 5, in the xy plane, the magnetic pole center line C1 passing through the magnetic pole center of the first magnetic pole coincides with a first radial direction. In this case, the first magnet insertion hole 211 faces the first tooth 311.

One of the two spaces 21d of each magnet insertion hole 21a faces the second tooth 312, and the other space 21d faces the third tooth 313.

The inner wall 211a of the first magnet insertion hole 211 facing inward in the first radial direction is in contact with the surface 22a of the permanent magnet 22 facing outward in the first radial direction.

A width M1 is a width of the surface 22a in the longitudinal direction of the permanent magnet 22 in the xy plane. In the example illustrated in FIG. 5, the width M1 is a width of the surface 22a in a first direction orthogonal to the magnetic pole center line C1.

In the xy plane, the width W1 is a maximum width of a portion of the inner wall 211a of the first magnet insertion hole 211 in contact with the surface 22a of the permanent magnet 22. In this embodiment, the width M1 and the width W1 have a relationship of W1<M1.

In the xy plane, the width W2 is a minimum width from the first magnet insertion hole 211 to the second magnet insertion hole 212.

A width T1 is a width of the first front end surface 311a of the first tooth 311 in the first direction orthogonal to the first radial direction in the xy plane. As described above, in FIG. 5, the first direction is also a direction orthogonal to the magnetic pole center line C1.

A width T2 is a width from the first front end surface 311a to the second front end surface 312a in the first direction. A width T3 is a width from the first front end surface 311a to the third front end surface 313a in the first direction. In this embodiment, T2=T3. A width from the second front end surface 312a to the third front end surface 313a in the first direction is T2+T1+T3=T1+2×T2.

In the example illustrated in FIG. 5, the motor 1 satisfies W2<W1<M1, and T1<W1<T1+2×T2.

With respect to the space 21d facing the second tooth 312, a width FB1 is a width of this space 21d in a second direction orthogonal to the second radial direction in the xy plane. With respect to the space 21d facing the second tooth 312, a width FB2 is a width of a portion of this space 21d facing the second front end surface 312a in a second direction orthogonal to the second radial direction in the xy plane. In the example illustrated in FIG. 5, with respect to the space 21d facing the second tooth 312, the width FB1 and the width FB2 has a relationship of FB1>FB2.

Similarly, with respect to the space 21d facing the third tooth 313, a width FB3 is a width of this space 21d in a third direction orthogonal to the third radial direction in the xy plane. With respect to the space 21d facing the third tooth 313, a width FB4 is a width of a portion of this space 21d facing the third front end surface 313a in the third direction orthogonal to the tooth radial direction in the xy plane. In the example illustrated in FIG. 5, with respect to the space 21d facing the third tooth 313, the width FB3 and the width FB4 has a relationship of FB3>FB4.

In this embodiment, the width FB1 of the space 21d facing the second tooth 312 is equal to the width of the FB3 of the space 21d facing the third tooth 313, and the width FB2 of the space 21d facing the second front end surface 312a is equal to the width FB4 of the space 21d facing the third front end surface 313a.

Figure 6:
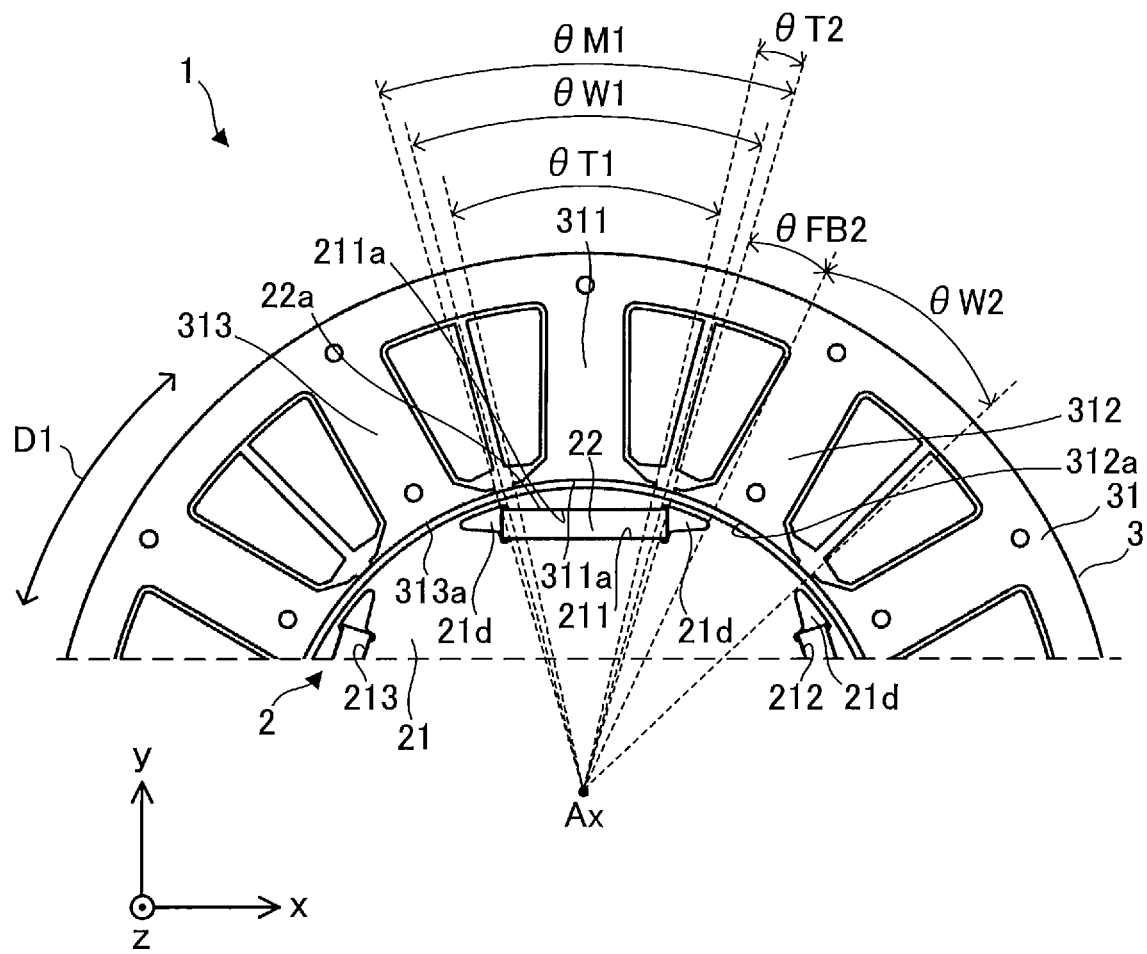
FIG. 6 is a diagram illustrating the motor shown in FIG. 5.

FIG. 6 is a diagram illustrating the motor 1 illustrated in FIG. 5.

In the example illustrated in FIG. 6, the motor 1 satisfies $\theta W2 < \theta W1 < \theta M1$, and $\theta T1 < \theta W1 < \theta T1 + 2 \times \theta T2$.

The angles $\theta W2$, $\theta W1$, $\theta M1$, $\theta T1$, and $\theta T2$ represent angles respectively corresponding to the widths W2, W1, M1, T1, and T2 shown in FIG. 5.

Specifically, the angle $\theta W2$ is an angle at which two lines respectively passing through the two points forming the width W2 (i.e., both ends of the width W2) in the xy plane intersect at the rotation center of the rotor 2. That is, the angle $\theta W2$ is an angle formed by a line passing through one end of the width W2 and the rotation center of the rotor 2 and a line passing through the other end of the width W2 and the rotation center of the rotor 2 in the xy plane.

The angle $\theta W1$ is an angle at which two lines respectively passing through the two points forming the width W1 in the xy plane intersect at the rotation center of the rotor 2. That is, the angle $\theta W1$ is an angle formed by a line passing through one end of the width W1 and the rotation center of the rotor 2 and a line passing through the other end of the width W1 and the rotation center of the rotor 2 in the xy plane.

The angle $\theta M1$ is an angle at which two lines respectively passing through the two points forming the width M1 in the xy plane intersect at the rotation center of the rotor 2. That is, the angle $\theta M1$ is an angle formed by a line passing through one end of the width M1 and the rotation center of the rotor 2 and a line passing through the other end of the width M1 and the rotation center of the rotor 2 in the xy plane.

The angle $\theta T1$ is an angle at which two lines respectively passing through the two points forming the width T1 in the xy plane intersect at the rotation center of the rotor 2. That is, the angle $\theta T1$ is an angle formed by a line passing through one end of the width T1 and the rotation center of the rotor 2 and a line passing through the other end of the width T1 and the rotation center of the rotor 2 in the xy plane.

The angle $\theta T2$ is an angle at which two lines respectively passing through the two points forming the width T2 in the xy plane intersect at the rotation center of the rotor 2. That is, the angle $\theta T2$ is an angle formed by a line passing through one end of the width T2 and the rotation center of the rotor 2 and a line passing through the other end of the width T2 and the rotation center of the rotor 2 in the xy plane.

Similarly, the angle $\theta FB2$ represents an angle corresponding to the width FB2 shown in FIG. 5. Specifically, the angle $\theta FB2$ is an angle at which two lines respectively passing through the two points forming the width FB2 in the xy plane intersect at the rotation center of the rotor 2. That is, the angle $\theta FB2$ is an angle formed by a line passing through one end of the width FB2 and the rotation center of the rotor 2 and a line passing through the other end of the width FB2 and the rotation center of the rotor 2 in the xy plane.

<Advantages of Motor 1>

Figure 7:
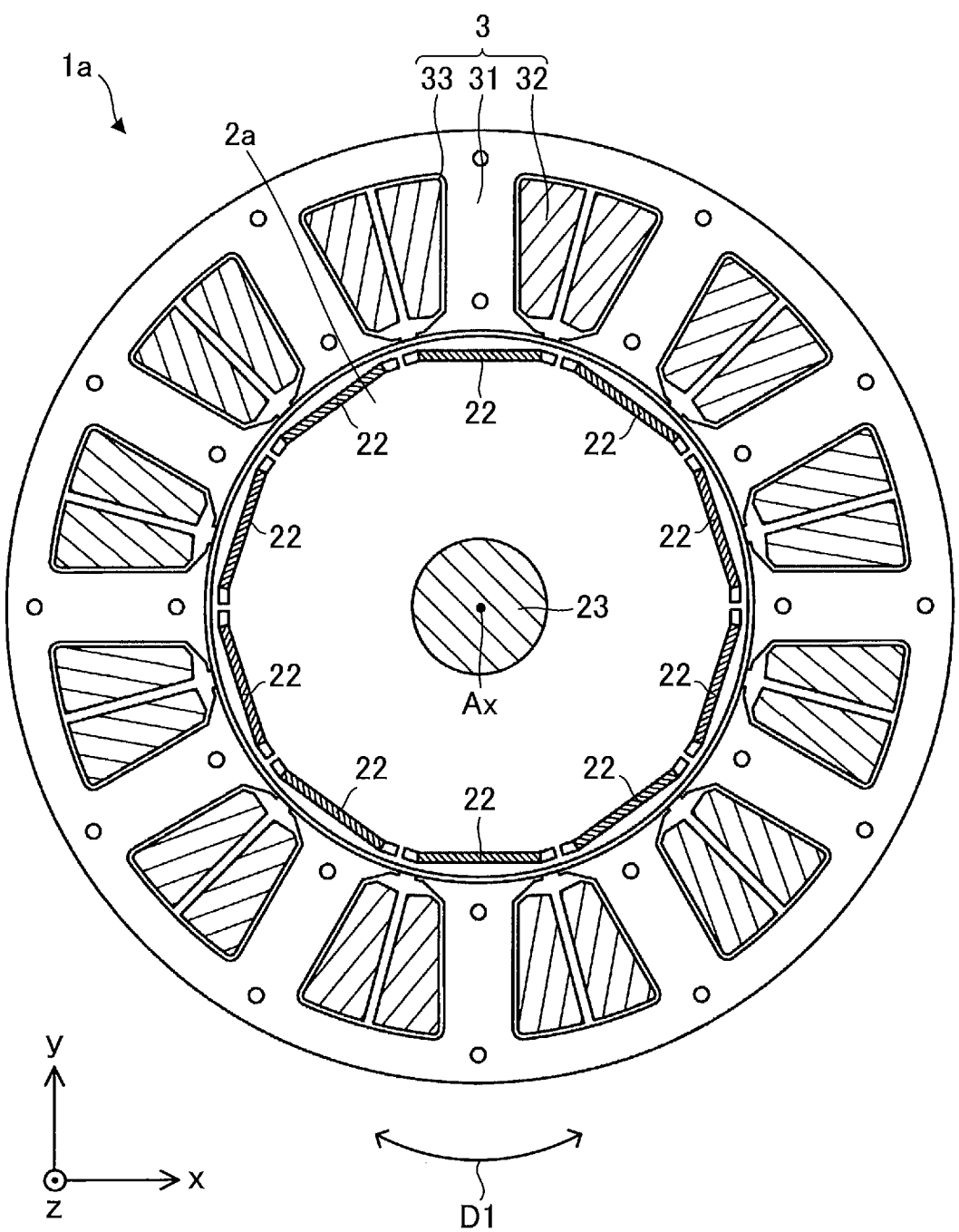
FIG. 7 is a cross-sectional view illustrating a motor according to a comparative example.

FIG. 7 is a cross-sectional view illustrating a motor 1a according to a comparative example.

In the motor 1a according to the comparative example, a rotor 2a is different from the rotor 2 of the motor 1 according to the present embodiment. Specifically, the rotor 2a of the motor 1a according to the comparative example is not a consequent pole rotor, but a conventional interior permanent magnet (IPM) rotor. Specifically, in the rotor 2a of the motor 1a according to the comparative example, permanent magnets 22 functioning as first magnets (e.g., north poles) to a stator 3 and permanent magnets 22 functioning as second magnetic poles (e.g., south poles) to the stator 3 are alternately arranged in the circumferential direction.

In general, in an IPM rotor, as a width M1 of each permanent magnet in a longitudinal direction increases, a magnetic force of the permanent magnet increases, and thus an output of the rotor increases. However, in a conventional motor that is not a consequent pole rotor, the width M1 of each permanent magnet in the longitudinal direction, specifically the width of each permanent magnet in the circumferential direction, is limited to L/n at maximum (L: circumference of the rotor core, n: the number of magnetic poles).

On the other hand, as shown in FIG. 5, the rotor 2 of the motor 1 according to the present embodiment satisfies W2<W1<M1. Thus, in the rotor 2 of the motor 1 according to the present embodiment, the width M1 of each permanent magnet 22 forming the first magnetic pole can be made larger than that in the comparative example. As a result, efficiency of the rotor 2 can be improved with a smaller number of permanent magnets 22 than the comparative example.

As shown in FIG. 5, the motor 1 according to the embodiment satisfies T1<W1. Thus, in the example shown in FIG. 5, it is possible to increase effective magnetic flux flowing from the permanent magnet 22 to the first tooth 311 that is a target tooth.

In a case where the width W1 is larger than T1+2×T2, magnetic flux from the permanent magnet 22 flows into a tooth that is not the target tooth, and thus magnetic flux leakage increases. In a case where the width W1 is larger than T1+2×T2, in FIG. 5, for example, magnetic flux from the permanent magnet 22 flows into the second tooth 312 and the third tooth 313, and thus magnetic flux leakage increases. As shown in FIG. 5, the motor 1 according to the embodiment satisfies W1<T1+2×T2. Thus, in the example shown in FIG. 5, it is possible to reduce magnetic flux leakage flowing into the second tooth 312 and the third tooth 313 adjacent to the first tooth 311 that is a target tooth.

The motor 1 according to the embodiment satisfies W2<W1<M1, and T1<W1<T1+2×T2. Thus, effective magnetic flux flowing from the permanent magnet 22 to the target tooth can be increased, and thus magnetic flux leakage flowing into a tooth adjacent to the target tooth can be reduced.

When the width FB1 and the width FB2 satisfy FB1>FB2, magnetic flux leakage flowing from the permanent magnet 22 disposed in the first magnet insertion hole 211 into the second tooth 312 can be reduced. Thus, effective magnetic flux flowing from the permanent magnet 22 into the target tooth can be increased, and magnetic flux leakage flowing into a tooth adjacent to the target tooth can be reduced.

Figure 8:
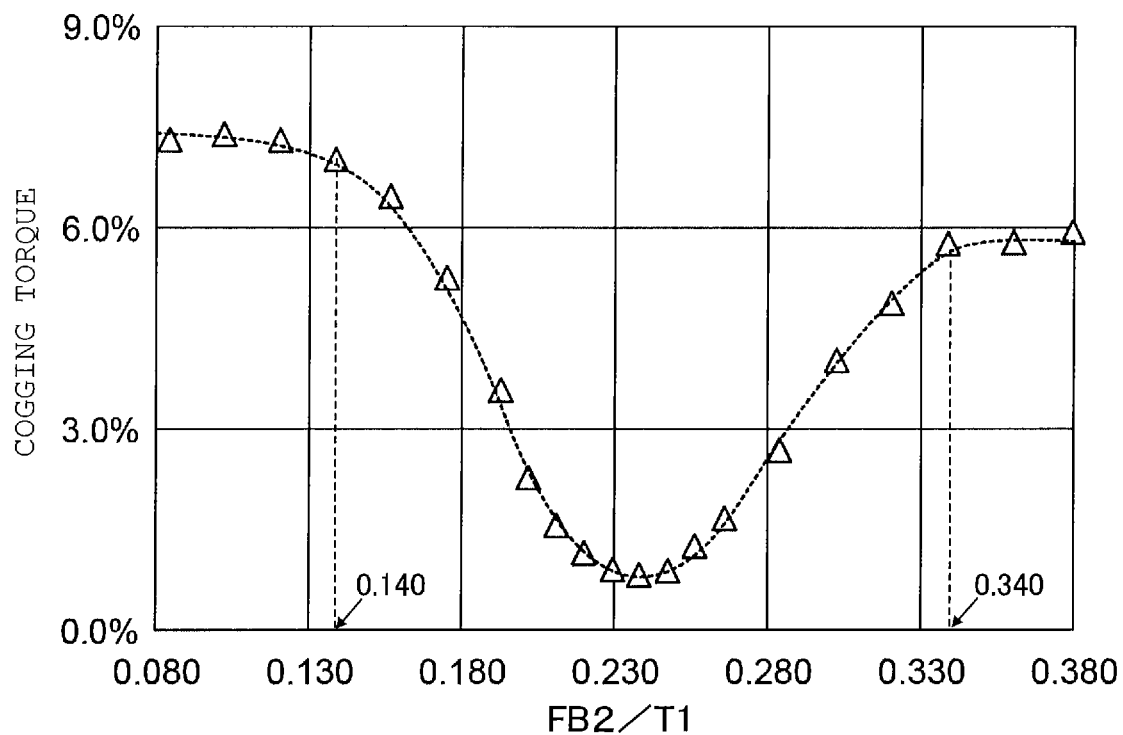
FIG. 8 is a graph showing a relationship between a cogging torque occurring in a motor and a ratio of a width of a space facing a second front end surface to a width of a first front end surface.

FIG. 8 is a graph showing a relationship between a cogging torque occurring in the motor 1 and a ratio FB2/T1 of the width FB2 of the space 21d facing the second front end surface 312a to the width T1 of the first front end surface 311a.

As shown in FIG. 8, the motor 1 preferably satisfies 0.14<FB2/T1<0.34. This configuration can reduce a cogging torque in the motor 1. As a result, vibrations and noise caused by a cogging torque in the motor 1 can be reduced.

Figure 9:
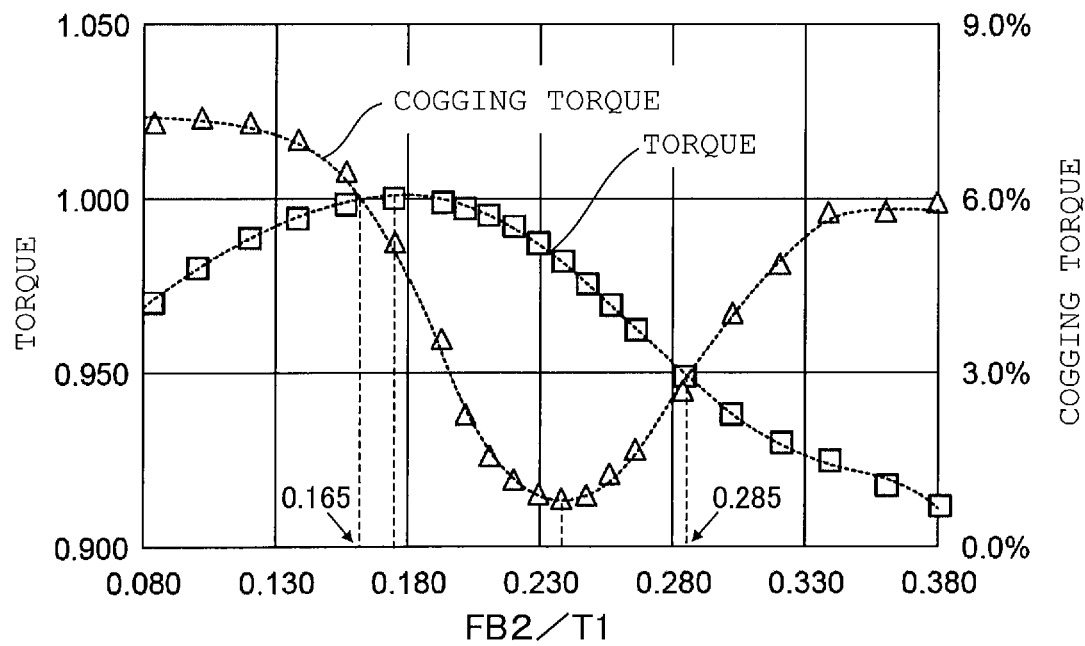
FIG. 9 is a graph showing a relationship between the cogging torque and the ratio of the width of the space facing the second front end surface to the width of the first front end surface, and a relationship between a torque of the motor and the ratio of the width of the space facing the second front end surface to the width of the first front end surface.

FIG. 9 is a graph showing a relationship between a cogging torque and a ratio FB2/T1 of the width FB2 of the space 21d facing the second front end surface 312a to the width T1 of the first front end surface 311a, and a relationship between a torque of the motor 1 and a ratio FB2/T1 of the width FB2 of the space 21d facing the second front end surface 312a to the width T1 of the first front end surface 311a. In FIG. 9, it is assumed that the torque has a maximum value of 1.000.

As shown in FIG. 9, the motor 1 preferably satisfies 0.165<FB2/T1<0.285. This configuration can reduce a cogging torque in the motor 1 while maintaining a maximum torque in the motor 1. As a result, it is possible to reduce vibrations and noise caused by a cogging torque in the motor 1 while maintaining a maximum torque in the motor 1.

As shown in FIG. 9, the motor 1 more preferably satisfies 0.175<FB2/T1<0.24. This configuration can suppress a decrease of the maximum torque of the motor 1 and can effectively reduce a cogging torque in the motor 1. As a result, a decrease of the maximum torque of the motor 1 can be suppressed, and thus vibrations and noise caused by a cogging torque in the motor 1 can be effectively reduced.

As shown in FIG. 6, the motor 1 according to the embodiment satisfies $\theta W2 < \theta W1 < \theta M1$, and $\theta T1 < \theta W1 < \theta T1 + 2 \times \theta T2$. Thus, in the example shown in FIG. 6, effective magnetic flux flowing from the permanent magnet 22 to the target tooth can be increased, and magnetic flux leakage flowing into the second tooth 312 and the third tooth 313 adjacent to the first tooth 311 that is a target tooth can be reduced.

Figure 10:
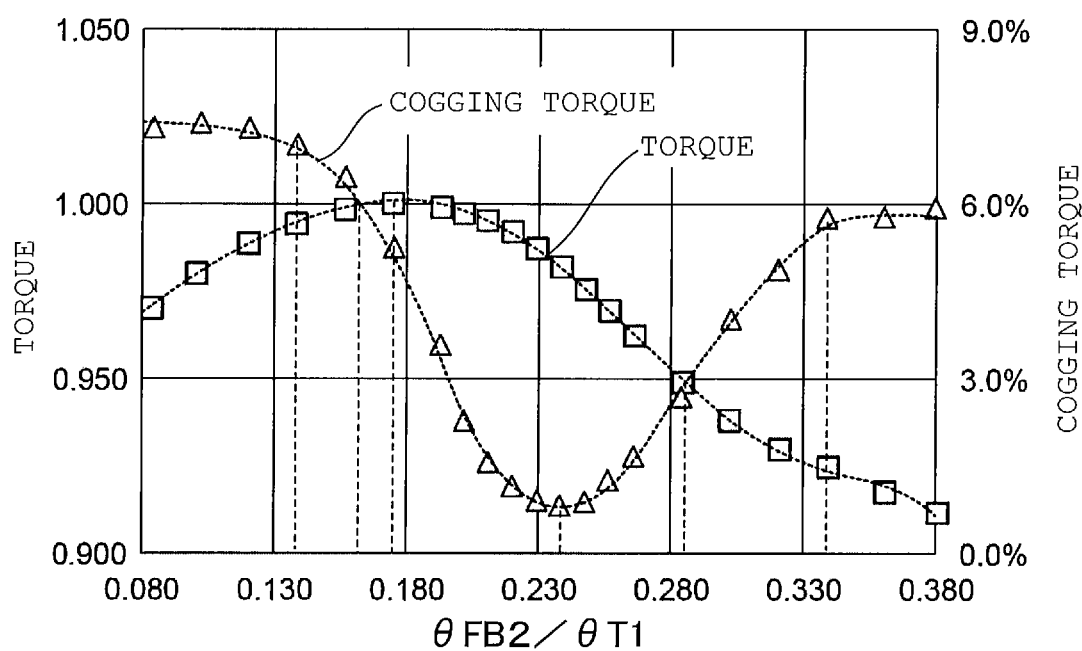
FIG. 10 is a graph showing a relationship between the cogging torque and a ratio $\theta FB2/\theta T1$ of an angle $\theta FB2$ corresponding to a width FB2 to an angle $\theta T1$ corresponding to a width T1, and a relationship between a torque of a motor 1 and the ratio $\theta FB2/\theta T1$ of the angle $\theta FB2$ corresponding to the width FB2 to the angle $\theta T1$ corresponding to the width T1.

FIG. 10 is a graph showing a relationship between a cogging torque and a ratio $\theta FB2/\theta T1$ of an angle $\theta FB2$ corresponding to the width FB2 to an angle $\theta T1$ corresponding to the width T1, and a relationship between a torque of the motor 1 and the ratio $\theta FB2/\theta T1$ of the angle $\theta FB2$ corresponding to the width FB2 to the angle $\theta T1$ corresponding to the width T1. In FIG. 10, it is assumed that the torque has a maximum value of 1.000.

As shown in FIG. 10, the motor 1 preferably satisfies $0.14 < \theta FB2/\theta T1 < 0.34$. This configuration can reduce a cogging torque in the motor 1. As a result, vibrations and noise caused by a cogging torque in the motor 1 can be reduced.

As shown in FIG. 10, the motor 1 preferably satisfies $0.165 < \theta FB2/\theta T1 < 0.285$. This configuration can reduce a cogging torque in the motor 1 while maintaining a maximum torque in the motor 1. As a result, it is possible to reduce vibrations and noise caused by a cogging torque in the motor 1 while maintaining a maximum torque in the motor 1.

As shown in FIG. 10, the motor 1 more preferably satisfies $0.175 < \theta FB2/\theta T1 < 0.24$. This configuration can suppress a decrease of the maximum torque of the motor 1 and can effectively reduce a cogging torque in the motor 1. As a result, a decrease of the maximum torque of the motor 1 can be suppressed, and thus vibrations and noise caused by a cogging torque in the motor 1 can be effectively reduced.

Second Embodiment

Figure 11:
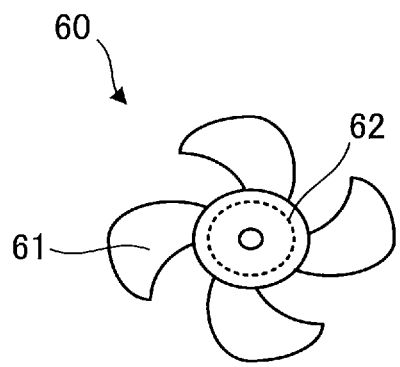
FIG. 11 is a diagram schematically illustrating a structure of a fan according to a second embodiment.

FIG. 11 is a diagram schematically illustrating a structure of a fan 60 according to a second embodiment.

The fan 60 includes a blade 61 and a motor 62. The fan 60 is also referred to as an air blower. The motor 62 is the motor 1 according to the first embodiment. The blade 61 is fixed to a shaft of the motor 62. The motor 62 drives the blades 61. Specifically, the motor 62 causes the blades 61 to rotate. When the motor 62 is driven, the blades 61 rotate to generate an airflow. In this manner, the fan 60 is capable of sending air.

In the fan 60 according to the second embodiment, the motor 1 described in the first embodiment is applied to the motor 62, and thus, the same advantages as those described in the first embodiment can be obtained. In addition, a decrease in efficiency of the fan 60 can be prevented.

Third Embodiment

An air conditioner 50 (also referred to as a refrigeration air conditioning apparatus or a refrigeration cycle apparatus) according to a third embodiment will be described.

Figure 12:
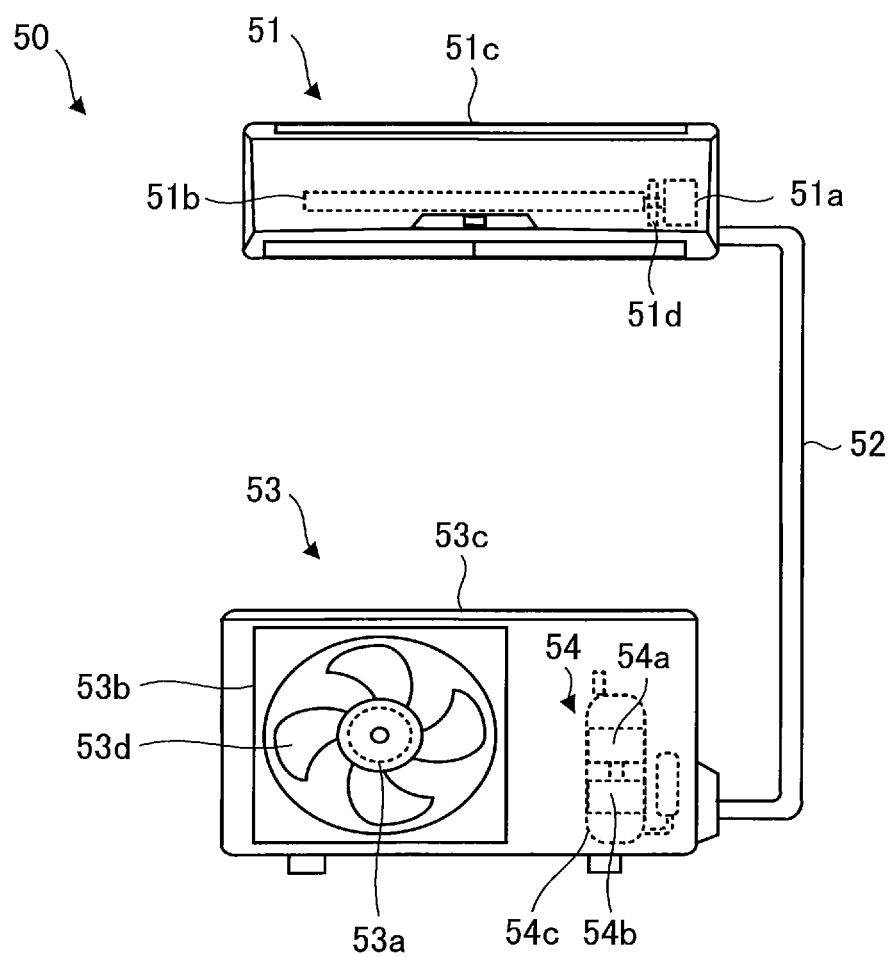
FIG. 12 is a diagram schematically illustrating a configuration of an air conditioner according to a third embodiment.

FIG. 12 is a diagram schematically illustrating a configuration the air conditioner 50 according to the third embodiment.

Figure 13:
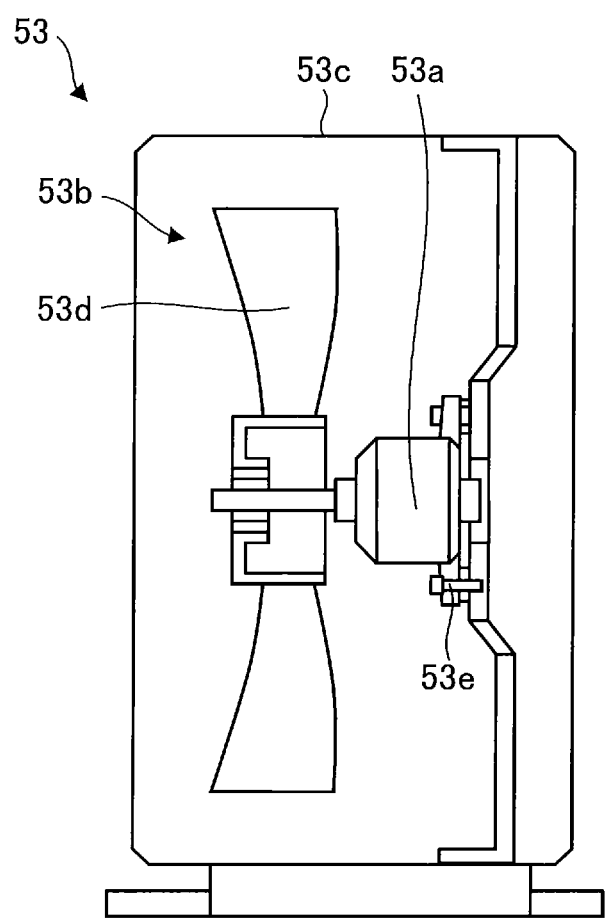
FIG. 13 is a diagram schematically illustrating main components in an outdoor unit as an air blower of the air conditioner.

FIG. 13 is a diagram schematically illustrating main components in an outdoor unit 53 as an air blower of the air conditioner 50.

The air conditioner 50 according to the third embodiment includes an indoor unit 51 as an air blower (first air blower), a refrigerant pipe 52, and an outdoor unit 53 as an air blower (second air blower) connected to the indoor unit 51. For example, the outdoor unit 53 is connected to the indoor unit 51 through a refrigerant pipe 52.

The indoor unit 51 includes a motor 51a (e.g., the motor 1 according to the first embodiment), an air blowing unit 51b that supplies air when being driven by the motor 51a, and a housing 51c covering the motor 51a and the air blowing unit 51b. The air blowing unit 51b includes, for example, blades 51d that are driven by the motor 51a. For example, the blades 51d are fixed to a shaft of the motor 51a, and generate an airflow.

The outdoor unit 53 includes a motor 53a (e.g., the motor 1 according to the first embodiment), an air blowing unit 53b, a compressor 54, a heat exchanger (not shown), and a housing 53c covering the air blowing unit 53b, the compressor 54, and the heat exchanger. When the air blowing unit 53b is driven by the motor 53a, the air blowing unit 53b supplies air. The air blowing unit 53b includes, for example, blades 53d that are driven by the motor 53a. For example, the blades 53d are fixed to a shaft of the motor 53a, and generate an airflow. The compressor 54 includes a motor 54a (e.g., the motor 1 according to the first embodiment), a compression mechanism 54b (e.g., a refrigerant circuit) that is driven by the motor 54a, and a housing 54c covering the motor 54a and the compression mechanism 54b.

In the air conditioner 50, at least one of the indoor unit 51 or the outdoor unit 53 includes the motor 1 described in the first embodiment. That is, one or both of the indoor unit 51 and the outdoor unit 53 includes the motor 1 described in the first embodiment. Specifically, as a driving source of an air blowing unit, the motor 1 described in the first embodiment is applied to at least one of the motors 51a or 53a. That is, the motor 1 described in the first embodiment is applicable to one or both of the indoor unit 51 and the outdoor unit 53.

The motor 1 described in the first embodiment may be applied to the motor 54a of the compressor 54.

The air conditioner 50 is capable of performing air conditioning such as a cooling operation of sending cold air and a heating operation of sending warm air from the indoor unit 51, for example. In the indoor unit 51, the motor 51a is a driving source for driving the air blowing unit 51b. The air blowing unit 51b is capable of sending conditioned air.

As illustrated in FIG. 13, in the outdoor unit 53, the motor 53a is fixed to the housing 53c of the outdoor unit 53 by screws 53e, for example.

In the air conditioner 50 according to the third embodiment, the motor 1 described in the first embodiment is applied to at least one of the motors 51a or 53a, and thus, the same advantages as those described in the first embodiment can be obtained. As a result, a decrease in efficiency of the air conditioning apparatus 50 can be prevented.

Furthermore, with the use of the motor 1 according to the first embodiment as a driving source of an air blower (e.g., the indoor unit 51), the same advantages as those described in the first embodiment can be obtained. As a result, a decrease in air blower efficiency can be prevented. The blower including the motor 1 according to the first embodiment and the blades (e.g., the blades 51d or 53d) driven by the motor 1 can be used alone as a device for supplying air. This blower is also applicable to equipment other than the air conditioner 50.

Furthermore, in the case of using the motor 1 according to the first embodiment as a driving source of the indoor unit 54, the same advantages as those described in the first embodiment can be obtained. As a result, a decrease in efficiency of the compressor 54 can be prevented.

The motor 1 described in the first embodiment can be mounted on equipment including a driving source, such as a ventilator, a household electrical appliance, or a machine tool, as well as the air conditioner 50.

Features of the embodiments described above can be combined as appropriate.

What is claimed is:

1. A motor comprising:
   a consequent pole rotor including a rotor core, a permanent magnet, a first magnetic pole region, and a second magnetic pole region, the rotor core having a first magnet insertion hole and a second magnet insertion hole adjacent to the first magnet insertion hole, the permanent magnet being disposed in the first magnet insertion hole, the first magnetic pole region functioning as a first magnetic pole, the second magnetic pole region serving as a second magnetic pole, the second magnetic pole being a pseudo-magnetic pole, the pseudo-magnetic pole being formed of a part of the rotor core between the first magnet insertion hole and the second magnet insertion hole; and
   a stator including a core back extending in a circumferential direction, a first tooth extending from the core back in a first radial direction of the consequent pole rotor, and a second tooth adjacent to the first tooth, the stator being disposed outside the consequent pole rotor,
   wherein
   an inner wall of the first magnet insertion hole facing inward in the first radial direction is in contact with a surface of the permanent magnet, the surface facing outward in the first radial direction, and
   the motor satisfies $W2<W1<M1$, and $T1<W1<T1+2\times T2$
   where M1 is a width of the surface of the permanent magnet in a longitudinal direction of the permanent magnet in a plane orthogonal to an axis direction of the consequent pole rotor,
   W1 is a maximum width of a portion of the inner wall of the first magnet insertion hole in the plane, the portion being in contact with the surface of the permanent magnet,
   W2 is a minimum width from the first magnet insertion hole to the second magnet insertion hole in the plane,
   T1 is a width of a first front end surface of the first tooth facing the rotor core in a first direction orthogonal to the first radial direction in the plane, and
   T2 is a width from the first front end surface to a second front end surface of the second tooth facing the rotor core in the first direction,
   wherein the first magnet insertion hole includes a magnet placement portion in which the permanent magnet is placed, and a space communicating with the magnet placement portion and facing the second tooth in the longitudinal direction of the permanent magnet, and
   in a case where a magnetic pole center line passing through a magnetic pole center of the first magnetic pole coincides with the first radial direction in the plane,
   the motor satisfies $FB1>FB2$
   where FB2 is a width of a portion of the space facing the second front end surface in a direction orthogonal to a second radial direction in which the second tooth extends from the core back in the plane, and FB1 is a width of the space facing the second tooth in the direction orthogonal to the second radial direction in the plane.

2. The motor according to claim 1, wherein
   the first magnet insertion hole includes a magnet placement portion in which the permanent magnet is placed, and a space communicating with the magnet placement portion and facing the second tooth in the longitudinal direction of the permanent magnet, and
   in a case where a magnetic pole center line passing through a magnetic pole center of the first magnetic pole coincides with the first radial direction in the plane,
   the motor satisfies $0.14<FB2/T1<0.34$
   where FB2 is a width of a portion of the space facing the second front end surface in a direction orthogonal to a second radial direction in which the second tooth extends from the core back in the plane.

3. The motor according to claim 1, wherein
   the first magnet insertion hole includes a magnet placement portion in which the permanent magnet is placed, and a space communicating with the magnet placement portion in the longitudinal direction of the permanent magnet, and
   in a case where a magnetic pole center line passing through a magnetic pole center of the first magnetic pole coincides with the first radial direction in the plane,
   the motor satisfies $0.165<FB2/T1<0.285$
   where FB2 is a width of a portion of the space facing the second front end surface in a direction orthogonal to a second radial direction in which the second tooth extends from the core back in the plane.

4. The motor according to claim 1, wherein
the first magnet insertion hole includes a magnet placement portion in which the permanent magnet is placed, and a space communicating with the magnet placement portion in the longitudinal direction of the permanent magnet, and
in a case where a magnetic pole center line passing through a magnetic pole center of the first magnetic pole coincides with the first radial direction in the plane,
the motor satisfies $0.175 < FB2/T1 < 0.24$
where FB2 is a width of a portion of the space facing the second front end surface in a direction orthogonal to a second radial direction in which the second tooth extends from the core back in the plane.

5. A motor comprising:
a consequent pole rotor including a rotor core, a permanent magnet, a first magnetic pole region, and a second magnetic pole region, the rotor core having a first magnet insertion hole and a second magnet insertion hole adjacent to the first magnet insertion hole, the permanent magnet being disposed in the first magnet insertion hole, the first magnetic pole region functioning as a first magnetic pole, the second magnetic pole region serving as a second magnetic pole, the second magnetic pole being a pseudo-magnetic pole, the pseudo-magnetic pole being formed of a part of the rotor core between the first magnet insertion hole and the second magnet insertion hole; and
a stator including a core back extending in a circumferential direction, a first tooth extending from the core back in a first radial direction of the consequent pole rotor, and a second tooth adjacent to the first tooth, the stator being disposed outside the consequent pole rotor, wherein
an inner wall of the first magnet insertion hole facing inward in the first radial direction is in contact with a surface of the permanent magnet, the surface facing outward in the first radial direction,
the motor satisfies $\theta W2 < \theta W1 < \theta M1$, and $\theta T1 < \theta W1 < \theta T1 + 2 \times \theta T2$
where M1 is a width of the surface of the permanent magnet in a longitudinal direction of the permanent magnet in a plane orthogonal to an axis direction of the consequent pole rotor,
W1 is a maximum width of a portion of the inner wall of the first magnet insertion hole in the plane, the portion being in contact with the surface of the permanent magnet,
W2 is a minimum width from the first magnet insertion hole to the second magnet insertion hole in the plane,
T1 is a width of a first front end surface of the first tooth facing the rotor core in a first direction orthogonal to the first radial direction in the plane,
T2 is a width from the first front end surface to a second front end surface of the second tooth facing the rotor core in the first direction,
$\theta W1$ is an angle at which two lines respectively passing through two points forming the maximum width W1 intersect at a rotation center of the consequent pole rotor in the plane,
$\theta W2$ is an angle at which two lines respectively passing through two points forming the minimum width W2 intersect at the rotation center in the plane,
$\theta M1$ is an angle at which two lines respectively passing through two points forming the width M1 intersect at the rotation center,
$\theta T1$ is an angle at which two lines respectively passing through two points forming the width T1 intersect at the rotation center in the plane, and
$\theta T2$ is an angle at which two lines respectively passing through two points forming the width T2 intersect at the rotation center in the plane,
wherein the first magnet insertion hole includes a magnet placement portion in which the permanent magnet is placed, and a space communicating with the magnet placement portion and facing the second tooth in the longitudinal direction of the permanent magnet, and
in a case where a magnetic pole center line passing through a magnetic pole center of the first magnetic pole coincides with the first radial direction in the plane,
the motor satisfies $FB1 > FB2$
where FB2 is a width of a portion of the space facing the second front end surface in a direction orthogonal to a second radial direction in which the second tooth extends from the core back in the plane, and FB1 is a width of the space facing the second tooth in the direction orthogonal to the second radial direction in the plane.

6. The motor according to claim 5, wherein
the first magnet insertion hole includes a magnet placement portion in which the permanent magnet is placed, and a space communicating with the magnet placement portion and facing the second tooth in the longitudinal direction of the permanent magnet, and
in a case where a magnetic pole center line passing through a magnetic pole center of the first magnetic pole coincides with the first radial direction in the plane,
the motor satisfies $0.14 < \theta FB2/\theta T1 < 0.34$
where FB2 is a width of a portion of the space facing the second front end surface in a direction orthogonal to a second radial direction in which the second tooth extends from the core back in the plane, and
$\theta FB2$ is an angle at which two lines respectively passing through two points forming the width FB2 intersect at the rotation center in the plane.

7. The motor according to claim 5, wherein
the first magnet insertion hole includes a magnet placement portion in which the permanent magnet is placed, and a space communicating with the magnet placement portion in the longitudinal direction of the permanent magnet, and
in a case where a magnetic pole center line passing through a magnetic pole center of the first magnetic pole coincides with the first radial direction in the plane,
the motor satisfies $0.165 < \theta FB2/\theta T1 < 0.285$
where FB2 is a width of a portion of the space facing the second front end surface in a direction orthogonal to a second radial direction in which the second tooth extends from the core back in the plane, and
$\theta FB2$ is an angle at which two lines respectively passing through two points forming the width FB2 intersect at the rotation center in the plane.

8. The motor according to claim 5, wherein
the first magnet insertion hole includes a magnet placement portion in which the permanent magnet is placed, and a space communicating with the magnet placement portion in the longitudinal direction of the permanent magnet, and in a case where a magnetic pole center line passing through a magnetic pole center of the first magnetic pole coincides with the first radial direction in the plane, the motor satisfies $0.175<\theta FB2/\theta T1<0.24$ where FB2 is a width of a portion of the space facing the second front end surface in a direction orthogonal to a second radial direction in which the second tooth extends from the core back in the plane, and $\theta FB2$ is an angle at which two lines respectively passing through two points forming the width FB2 intersect at the rotation center in the plane.

9. A fan comprising:
a blade; and
the motor according to claim 1 to drive the blade.

10. An air conditioner comprising:
an indoor unit; and
an outdoor unit connected to the indoor unit, wherein
one or both of the indoor unit and the outdoor unit include the motor according to claim 1.

11. A fan comprising:
a blade; and
the motor according to claim 5 to drive the blade.

12. An air conditioner comprising:
an indoor unit; and
an outdoor unit connected to the indoor unit, wherein
one or both of the indoor unit and the outdoor unit include the motor according to claim 5.

* * * * *